United States Patent [19]

Coleman

[11] Patent Number: 5,324,527
[45] Date of Patent: Jun. 28, 1994

[54] CANDY SUCKER AND LIQUID CANDY DISPENSING ASSEMBLY

[75] Inventor: Thomas J. Coleman, Bristol, Va.

[73] Assignee: Baat Enterprises, Inc, Bristol, Va.

[21] Appl. No.: 140,713

[22] Filed: Oct. 22, 1993

Related U.S. Application Data

[63] Continuation-in-part of Ser. No. 965,778, Oct. 23, 1992, abandoned.

[51] Int. Cl.⁵ .................... A23G 3/00; B65B 29/10
[52] U.S. Cl. .................... 426/134; 426/110; 426/115
[58] Field of Search .............. 426/134, 132, 104, 115, 426/112, 120, 91, 110, 421; 222/215, 390

[56] References Cited

U.S. PATENT DOCUMENTS

| | | | |
|---|---|---|---|
| 1,340,043 | 5/1920 | Grace | 222/390 |
| 1,484,331 | 2/1924 | Hopkins | 222/390 |
| 2,121,185 | 6/1938 | Claff | 426/134 |
| 2,252,119 | 8/1941 | Edmonds | 222/215 |
| 2,421,711 | 6/1947 | Moots et al. | 222/390 |
| 2,517,027 | 8/1950 | Rado | 222/215 |
| 2,766,123 | 10/1956 | Moubayed | 426/132 |
| 3,105,612 | 10/1963 | Krasnoff et al. | 222/15 |
| 3,116,152 | 12/1963 | Smith | 426/115 |
| 3,545,980 | 12/1970 | Stanger | 426/134 |
| 3,821,425 | 6/1974 | Russell | 426/134 |
| 4,229,482 | 10/1980 | Kreske | 426/134 |
| 4,452,823 | 6/1984 | Connolly et al. | 426/115 |
| 4,574,987 | 3/1986 | Halligan et al. | 426/115 |
| 4,798,313 | 1/1989 | Farley | 426/115 |
| 4,830,222 | 5/1989 | Read | 426/115 |
| 4,888,188 | 12/1989 | Castner et al. | 426/115 |

FOREIGN PATENT DOCUMENTS 2604061 3/1988 France ........................... 426/134

*Primary Examiner*—Steven Weinstein

[57] ABSTRACT

This invention relates to novelties and in particular to a novel candy holding and dispensing device which dispenses a liquid edible filling from a reservoir through a hollow stick attached to the sucker and through an channel (s) in the sucker type candy. This device includes a hollow plastic housing or reservoir which would contain a liquid edible filling. The hollow plastic housing may be pliable for applying a squeeze pressure to the liquid or of a hard plastic for which a piston force is necessary to force the liquid from the plastic housing. For a hard plastic housing or reservoir an attached threaded shaft is used. When turned, the threaded shaft pushes the liquid filling through a hollow stick at the top of the cylinder. The liquid filling then passes out of the hollow stick into a sucker type candy with channel (s) and oozes out at the top of the sucker type candy. The candy combination is now ready for consumption and eaten simultaneously.

10 Claims, 2 Drawing Sheets

5,324,527

CANDY SUCKER AND LIQUID CANDY DISPENSING ASSEMBLY

This is a continuation-in-part of copending application Ser. No. 07/965,778 filed on Oct. 23, 1992, now abandoned.

This invention is directed to a confection novelty including a sucker type candy which is designed to be eaten in conjunction with a second "liquid" candy dispensed upon the outer surface of the sucker while eating the sucker type candy.

It is well known in the prior art that liquid substances have been dispensed through a variety of housings, using a variety of means.

U.S. Pat. No. 4,526,295 is directed to a cartridge for injecting a semi-pasty product; U.S. Pat. No. 3,007,611 relates to a metering dispenser for flowable materials; U.S. Pat. No. 4,676,406 is directed to a squirt cartridge for mixing and dispensing a two component mass; U.S. Pat. No. 3,140,078 relates to a mixing and dispensing device; U.S. Pat. No. 2,833,451 is directed to a caulking gun and cartridge; U.S. Pat. No. 3,003,424 relates to a grease gun. All of the above patents make use of a dispensing device for some specific purpose.

It is therefore an object of this invention to make use of a dispensing device to dispense a liquid edible filling through at least one passage of channel in the sucker type candy to enhance flavor and to provide an unusual and unique treat.

DETAILED DESCRIPTION

Figure 1:
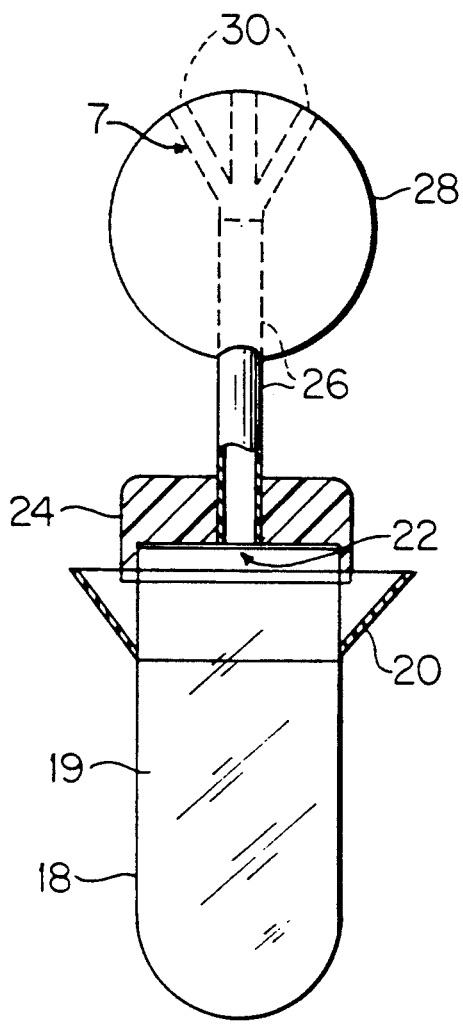
FIG. 1 is a full view of a novelty candy holding and dispensing device consisting of a combination of a liquid filling reservoir with a sucker type candy attached.
Figure 2:
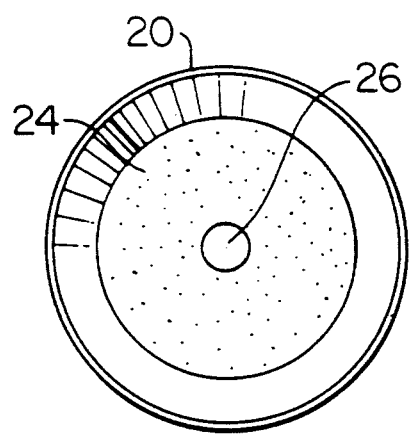
FIG. 2 is a top view of the top cap and drip guard.
Figure 3:
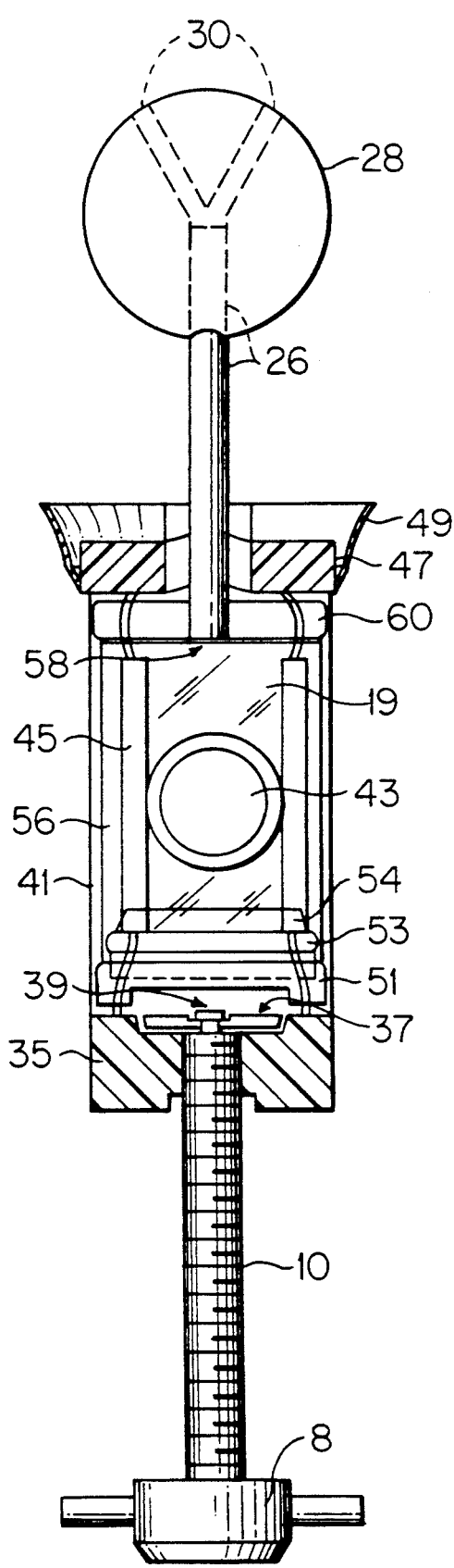
FIG. 3 is a cross section view of a more expensive novelty candy holding and dispensing device with a replaceable refill consisting of a liquid filling reservoir and a sucker type candy attached already loaded.
Figure 4:
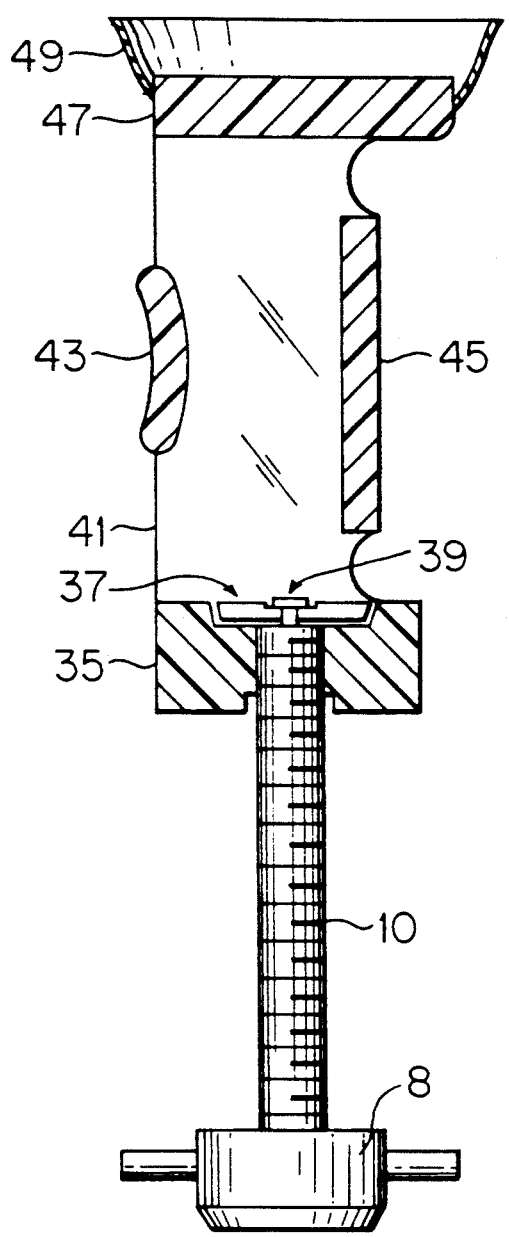
FIG. 4 is a side view of a more expensive novelty candy holding and dispensing device without a replaceable refill.

Now referring to the drawings, FIGS. 1 and 2 illustrate a candy sucker with at least one channel that passes through the sucker. A hollow stick (26) is secured at one end to at least one channel of the sucker and extends downwardly to connect with a top cap (24) of a reservoir (18) which contains a candy flavored edible liquid which can be squeezed upwardly through the hollow stick and the at least one channel onto the outer surface of the sucker by pressure applied to the reservoir or pressure applied to the liquid in the reservoir. The reservoir or the stick is surrounded by a drip guard (20) upon which any excess liquid will drip from the sucker. The reservoir can be made of any suitable pliable material by which a user can squeeze the reservoir which applies a pressure on the liquid in the reservoir to force the liquid upwardly through the hollow stick and through the at least one channel onto the outer surface of the sucker. As the liquid from the reservoir passes through the channels in the candy sucker, the liquid collects some of the candy flavor and when the combination of the liquid and the collected candy flavor flows over the outer surface the flavor of the candy sucker is enhanced by the flavor combination. However, the reservoir can be made of a hard material as set forth later. The sucker in FIG. 1 is shown with a central channel from which oppositely disposed channels (30) extend to the outer surface of the sucker. Since the candy sucker surrounds and adheres to the hollow stick, the hollow stick and channel in which the hollow stick is secured has been shown by spaced dotted lines. The end of the hollow stick has been shown in the drawing by a line transverse to the channel. From the end of the hollow stick, there is shown in FIGS. 1, 3, and 4 additional channels which are formed in the candy sucker. The hollow stick need not extend to a vicinity of the center as shown and can extend into the sucker a greater or lesser distance. The sucker is shown in FIG. 1 with the hollow stick secured to the top of the reservoir. When using a pliable reservoir material the hollow stick could extend downwardly to near the bottom of the reservoir and the liquid forced upwardly through the hollow stick onto the outer surface of the sucker.

When the reservoir or cylinder (56) is made of a hard material such as plastic or any other suitable material, it is necessary to provide some means for holding the reservoir and for forcing the liquid up through the hollow stick and the candy sucker. In this case, the bottom end of the hollow stick, or the end not connected to the candy sucker will extend just into the top cap (60) as shown in FIGS. 3-6. Thus, the upper end of the cylinder is closed by the top cap (60) and the bottom end is open and enclosed by a piston or plunger (54) which is provided with an edge seal (53). The cylinder (56) is placed in a holder formed by a housing formed of any suitable material such as hard plastic as shown in FIGS. 3-6. FIG. 3 illustrates the reservoir held in the housing ready for forcing the candy liquid from the reservoir onto the candy sucker.

Figure 5:
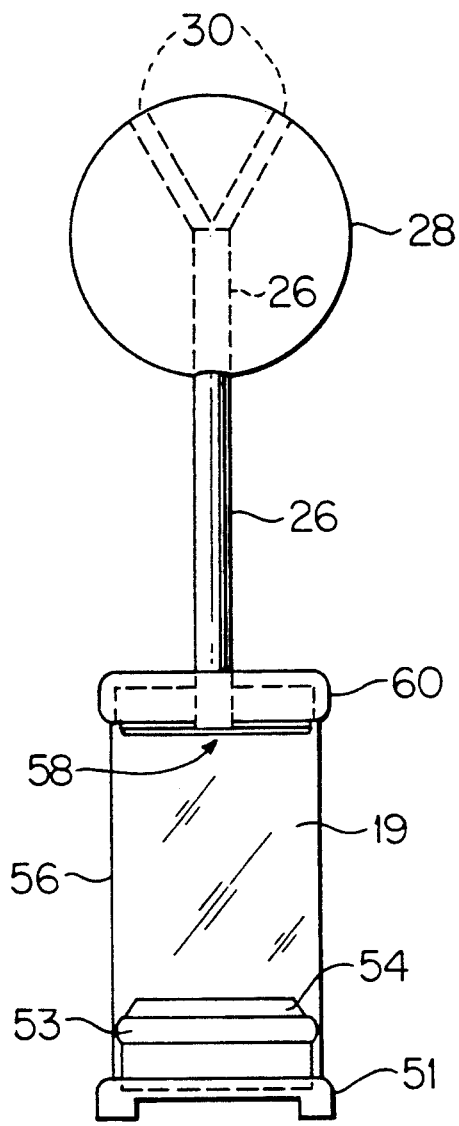
FIG. 5 is a full view of a replaceable refill with a liquid filling reservoir and a sucker type candy attached.
Figure 6:
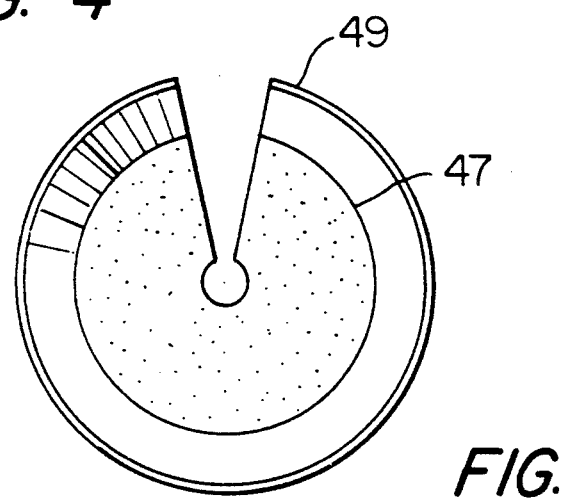
FIG. 6 is a top view of the slotted top ring with attached slotted drip guard.

FIGS. 4 and 6 illustrate the candy holding and dispensing device. The plastic housing (41) has an open access on one side and a reservoir ejection port opening (43) on the opposite side used for loading and unloading a refill shown in FIG. 5. The plastic housing (41) has a threaded base (35). A threaded plunger shaft (10), with attached leverage knob (8), threads through the threaded base and has attached thereto a plunger seat (37) with a stabilizer pin (39). Side guards (45) are attached to the plastic housing (41) on each side of the open access to secure the refill (FIG. 5) within the plastic housing (41). A slotted top ring (47) and a slotted drip guard (49) are attached to the top of the plastic housing (41) both having an opened side located directly above the open access in the plastic housing (41) to accommodate the hollow stick or tubular member (26).

FIG. 5 illustrates the reservoir or plastic cylinder (56) refill containing the liquid filling reservoir (19), the tubular member (26) and attached sucker type candy (28) with apertures (30) shown in the candy sucker. The plastic cylinder (56) has a base cap (51) on the bottom and a top cap (60) on the opposite end. The plunger (54) with the attached plunger seal (53) is located directly above the base cap (51) within the plastic cylinder (56) which prevents any leakage from the bottom. The plastic cylinder (56) is the reservoir for the liquid filling (19) and is provided with a breakthrough seal (58) located at the top, and below the hollow stick or tubular member. The tubular member (26) is attached to the top cap (60) at one end and has a sucker type candy (28) attached to the opposite end. The sucker type candy is provided with two apertures as shown.

FIG. 3 illustrates a front view of a fully assembled candy holding and dispensing device. Upon rotation of the leverage knob (8), the threaded shaft (10) pushes the plunger (54) upwardly in the cylinder (56) to apply pressure to the liquid filling (19) which ruptures the breakthrough seal (58) allowing the liquid filling (19) to pass through the tubular member (26) and through the channels (30) of the sucker type candy (28) onto the outer surface of the sucker type candy.

The holding device and candy may be of any shape or size; however, it is desired that the sucker type candy (28) be spherical in shape such as a well known sucker. The sucker type candy (28) may have any number of channels (30) in any pattern. The candy is covered by a protective wrapper before use to provide a sanitary sucker.

The edible liquid filling (19) may be of any flavor or consistency conducive to the proper operation of the invention.

A variety of means may be used for forcing the liquid filling (19) from the reservoir through the tubular member (26) as well as the channels (30) of the sucker type candy (28) onto the outer surface of the sucker type candy (28) i.e. manual, mechanical or electrical.

The holding device housing may be made of any durable material which may be formed or molded into any desired shape. Since the novelty device is to be used by children, the device should have no sharp features. It should be of a so called non-breakage material and non-toxic.

It is well known that children dislike taking medicine from a container such as a spoon. It should occur to those skilled in the art that the reservoir could be filled with a medicine and the medicine could be squeezed upon the sucker so that the child would receive the medicine as it oozes onto the sucker.

What is claimed is:

1. A candy sucker and liquid candy dispensing assembly which comprises:

an edible candy sucker body having an upper end portion and a bottom end portion, said upper end portion having a rounded curvature, a first channel in said body that extends from an opening in the surface of said body at the bottom end portion of said body to a position part way into said body and toward said upper end portion and at least one connecting channel in said body that extends from adjacent the upper end of said first channel to at least one opening in the surface of said upper end portion of said body, said opening in said surface of said body at the bottom end portion, said first channel in said body, said at least one connecting channel in said body and said at least one opening in said upper end portion of said body all being in fluid communication with each other in said body; an elongated tubular support member having an upper end, a lower end, and a passageway therethrough, said upper end and an adjacent upper portion of said tubular support member being secured to said body through said opening in said bottom surface by being secured in said first channel such that said passageway in said tubular support member is in fluid communication with said first channel;

a reservoir having a closed bottom end and a closed upper end and containing an edible, flavored candy fluid solution, said lower end of said tubular support member being connected to said upper closed end of said reservoir such that said passageway in said tubular support member is in fluid communication with said reservoir, said reservoir being made of a material such that external pressure on said reservoir forces said fluid solution sequentially from said reservoir into and through said tubular support member, through said first channel, through said at least one connecting channel and then out said at least one opening in said upper end portion and onto said surface of said rounded upper end of said body; said fluid solution passing through said at least one connecting channel and through any portion of said first channel that does not contain said tubular support member being in direct contact with said candy sucker body such that said fluid solution collects some of the flavor of said body which enhances the flavor of the surface of the candy sucker body when the combination of said fluid solution and said collected flavor flows through said at least one opening and onto said surface of said candy sucker body.

2. The assembly as set forth in claim 1, in which:
said edible body has a cylindrical lower bottom end portion that extends upwardly to said upper rounded curvature end.

3. The assembly as set forth in claim 1, in which:
said edible body is spherical and said tubular support member extends along said first channel passing along a diameter of said spherical body up to substantially a center of said edible body.

4. The assembly as set forth in claim 1, which includes:
a means for forcing said fluid solution from said reservoir through said tubular member and through said body onto an outer surface of said sucker.

5. The assembly as set forth in claim 4, in which:
said reservoir is a plastic cylinder.

6. The assembly as set forth in claim 5, in which:
said means for forcing the solution onto the outer surface of said body is a piston, moveable in said plastic cylinder.

7. The assembly as set forth in claim 6, which includes a holder for holding said reservoir in a fixed position, and a screw means for moving the piston in the reservoir.

8. The assembly as set forth in claim 1, wherein: said reservoir is formed of a pliable material.

9. The assembly, as set forth in claim 1, in which;
said first channel in said edible body extends along a common axis with an axes of said reservoir, and wherein there are at least two connecting channels with one of said connecting channels extending along a common axis with said first channel and at least a second connecting channel branching off from said axial alignment.

10. The assembly of claim 1, wherein said at least one connecting channel comprises a central channel which passes through the center of said body and oppositely disposed second and third channels that extend from said central channel outwardly to said upper end portion of said body.

* * * * *